United States Patent
Hren

(10) Patent No.: US 10,241,456 B1
(45) Date of Patent: Mar. 26, 2019

(54) ADAPTIVELY SWITCHING A PRINT MODE FROM DUPLEX TO SIMPLEX

(71) Applicant: Allan A. Hren, Longmont, CO (US)

(72) Inventor: Allan A. Hren, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 24 days.

(21) Appl. No.: 15/716,032

(22) Filed: Sep. 26, 2017

(51) Int. Cl.
| B41J 3/60 | (2006.01) |
| B41J 13/00 | (2006.01) |
| G03G 15/23 | (2006.01) |
| H04N 1/23 | (2006.01) |
| B41J 11/00 | (2006.01) |

(52) U.S. Cl.
CPC .............. G03G 15/238 (2013.01); B41J 3/60 (2013.01); B41J 13/0045 (2013.01); G03G 15/231 (2013.01); G03G 15/234 (2013.01); H04N 1/2369 (2013.01); B41J 11/002 (2013.01); G03G 15/232 (2013.01); G03G 2215/00021 (2013.01); G03G 2215/00586 (2013.01)

(58) Field of Classification Search
CPC ...... B41J 3/60; B41J 13/0009; B41J 13/0045; G03G 15/231; G03G 15/234; G03G 15/238; G03G 2215/00021; G03G 2215/00586; H04N 1/2369
See application file for complete search history.

(56) References Cited

U.S. PATENT DOCUMENTS

| 4,924,275 A | 5/1990 | Nelson |
| 5,568,246 A | 10/1996 | Keller et al. |
| 5,772,343 A * | 6/1998 | Beretta ................. B41J 3/60 101/234 |
| 6,018,640 A * | 1/2000 | Blackman ............. B41J 3/60 399/110 |
| 6,603,945 B2 | 8/2003 | Amarakoon et al. |
| 7,912,396 B2 | 3/2011 | Park |

(Continued)

FOREIGN PATENT DOCUMENTS

DE 69629232 9/2003

OTHER PUBLICATIONS

L. Swartjes et al.; Simultaneous analysis and design based optimization for paper path and timing design of a high-volume printer; TU/e University of Technology;Jan. 1, 2017.

(Continued)

*Primary Examiner* — Ahn T. N. Vo
(74) *Attorney, Agent, or Firm* — Duft & Bornsen, PC

(57) ABSTRACT

System and method for adaptively switching a print mode from duplex to simplex. In one embodiment, a processor monitors memory to detect a duplex page followed by multiple contiguous simplex pages. The processor estimates a first time for the duplex sheet corresponding to the duplex page to traverse a duplex media path for switching from a duplex print mode to a simplex print mode. The processor also estimates a second time for simplex sheets corresponding to the multiple contiguous simplex pages to traverse the simplex media path in the simplex print mode, and estimates a third time for the simplex sheets to traverse the duplex media path in the duplex print mode. If the third time is less than a sum of the first time and the second time, the processor modifies the instructions to print the multiple contiguous simplex pages in the duplex print mode.

20 Claims, 6 Drawing Sheets

(56) References Cited

U.S. PATENT DOCUMENTS

| | | |
|---|---|---|
| 8,276,909 B2 | 10/2012 | Willis |
| 8,913,293 B2 | 12/2014 | Fukasawa |
| 9,513,850 B2 | 12/2016 | Thijssen et al. |
| 2005/0163550 A1* | 7/2005 | Gobbak ................ G06K 15/00 400/76 |
| 2011/0102525 A1* | 5/2011 | Larson ...................... B41J 3/60 347/102 |
| 2014/0327724 A1 | 11/2014 | Sarbjit et al. |

OTHER PUBLICATIONS

Xerox DocuPrint 96/4635/180 IPS Guide to Configuring and Managing the System; Version 7.1 Aug. 2000.

* cited by examiner

ADAPTIVELY SWITCHING A PRINT MODE FROM DUPLEX TO SIMPLEX

FIELD OF THE INVENTION

The invention relates to the field of printing systems and, in particular, to printers capable of printing in a duplex print mode.

BACKGROUND

Duplex printing is a feature in which both sides of a sheet of media (e.g., paper) are marked with ink. Cut-sheet printers capable of duplex printing are typically equipped with a flipping unit that flips the sheet of media after printing on the front side so that the sheet may be conveyed through the print engine again for printing on the back side. As such, duplex-capable printers contain two media paths: a "simplex" path that all sheets travel for printing on the front side, and a "duplex" media path that loops back in the printer to the beginning of the simplex path for optionally printing on the back side of the sheet. Printing in a simplex print mode is generally faster than a duplex print mode since the simplex path is shorter.

However, it is sometimes faster to use the duplex print mode to print simplex sheets (i.e., where the back side is "printed" as a blank page) due to a delay in printing which results from switching the print mode from duplex back to simplex. The delay is necessary because it allows the printer to confirm that the media path is clear so that sheets are conveyed and printed properly in the desired order. Thus, when printing a mixture of simplex and duplex sheets (sometimes referred to as mixplex print jobs), the printer may be repeatedly delayed due to waiting for the media path to be cleared for switching from duplex print mode back to simplex print mode. Print shop operations with production printers therefore desire improved efficiency in printing mixplex print jobs.

SUMMARY

Embodiments described herein provide for adaptively switching a print mode from duplex to simplex. If the printer is already in a duplex print mode and there is a series of upcoming simplex pages to print, the system is able to accurately determine whether it will be faster to: (1) switch the print mode to simplex print mode for printing the simplex pages, or (2) remain in the duplex print mode for printing the simplex pages. To do so, the system may analyze the properties of incoming pages (e.g., travel distance from its input tray to output device) to determine the time delay for properly clearing the printer's media path to allow the switch. Print-related variables are tracked and used to continuously adapt the threshold for switching from a duplex print mode to a simplex print mode, thereby improving printing throughput.

In one embodiment, a print system includes an interface, memory, and a print controller. The interface receives a plurality of pages and instructions to print the plurality of pages, and the memory stores the plurality of pages and the instructions for printing. The print controller monitors the memory to detect a duplex page followed by multiple contiguous simplex pages. The print controller also estimates a first time for a duplex sheet corresponding to the duplex page to traverse a duplex media path of the print system, thereby clearing the duplex media path and allowing for the print system switching from a duplex print mode to a simplex print mode. The print controller further estimates a second time for simplex sheets corresponding to the multiple contiguous simplex pages to traverse the simplex media path of the print system in the simplex print mode, and estimates a third time for the simplex sheets to traverse the duplex media path of the print system in the duplex print mode. The print controller modifies the instructions to print the multiple contiguous simplex pages in the duplex print mode if the third time is less than a sum of the first time and the second time, and outputs the plurality of pages and the instructions for printing.

Other illustrative embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF THE EMBODIMENTS

The figures and the following description illustrate specific illustrative embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
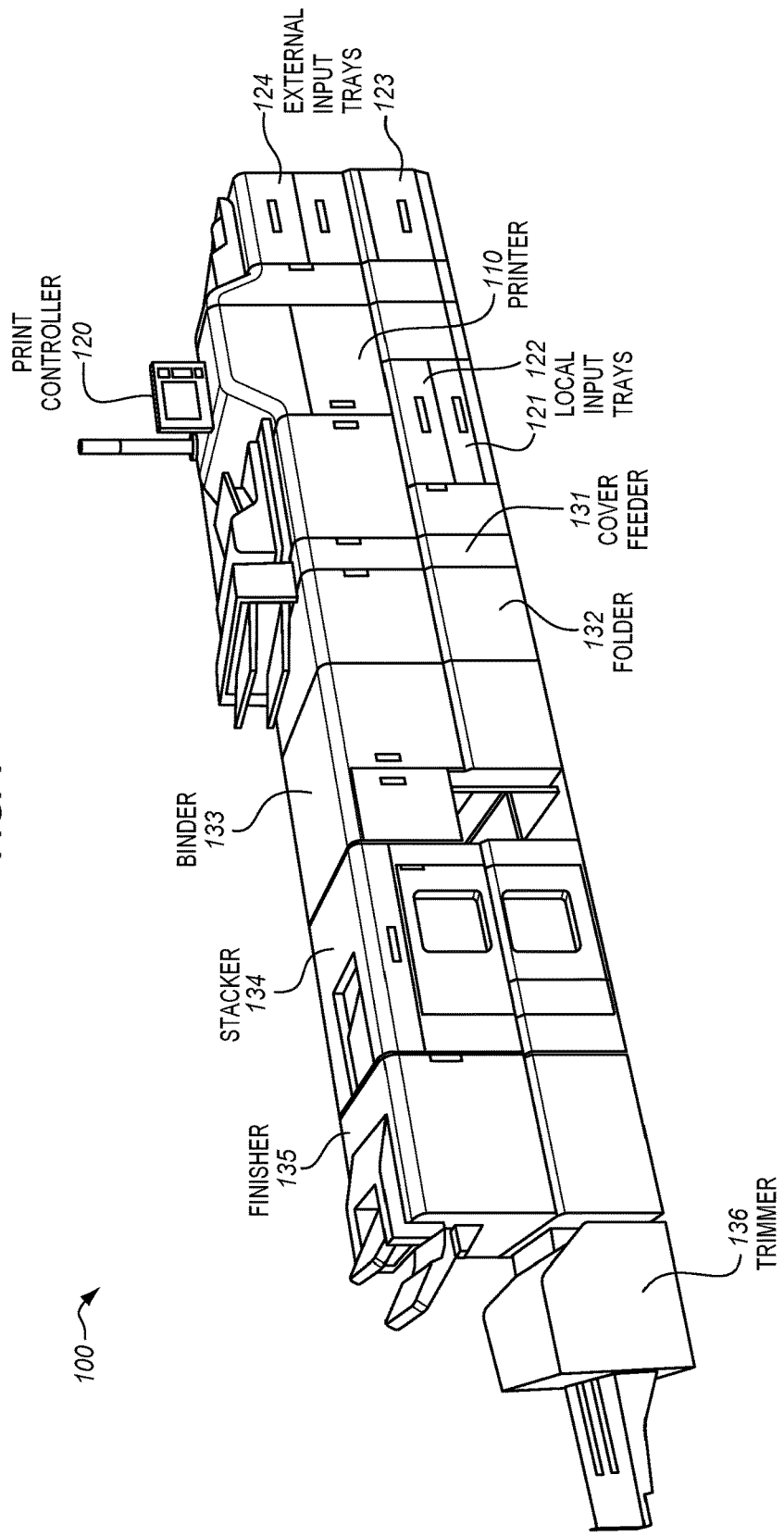
FIG. 1 illustrates a print system in an illustrative embodiment.

FIG. 1 illustrates a print system 100 in an illustrative embodiment. The print system 100 includes a printer 110 and may also include one or more post-print devices 131-136. In this example, the print system 100 includes a cover feeder 131, a folder 132, a binder 133, a stacker 134, a finisher 135, and a trimmer 136. Media, such as cut sheet paper or other printable substrate media, is stored in one or more local input trays 121-122 and/or one or more external input trays 123-124 and fed through the printer 110 and the post-print devices 131-136. The print system 100 also includes a print controller 120 that controls the overall operation of the print system 100. As will be described in greater detail below, the print controller 120 is enhanced to adaptively switch the print system 100 from a duplex print mode to a simplex print mode.

Figure 2:
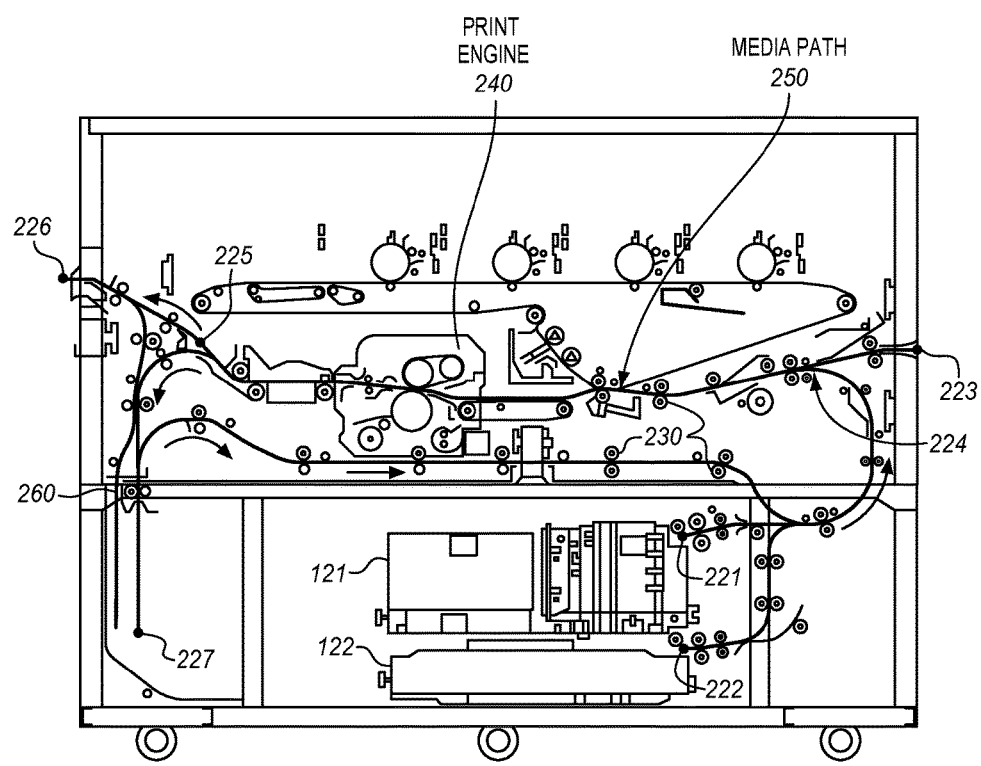
FIG. 2 illustrates a cross-sectional view of a printer in an illustrative embodiment.

FIG. 2 illustrates a cross-sectional view of the printer 110 in an illustrative embodiment. The printer 110 includes a print engine 240 to physically mark sheets of media (e.g., with a marking material such as ink, another marking liquid or toner) and a media path 250 which defines how the media traverses through the printer 110. The media path 250 may be defined by the guides, roller, stops, and/or other media transport devices of the print system 100 (examples of which are shown by element 230). The media is fed from internal input points 221-222 of the local input trays 121-122 or external input point 223 (e.g., via external input trays 123-124 or other pre-print devices) and traverses from a beginning point 224, through the print engine 240, and to a divergence point 225 downstream from the print engine 240.

The printer 110 is capable of printing in a simplex print mode or a duplex print mode. In the simplex print mode, the print engine 240 marks one side (i.e., a front side) of a sheet of media and the sheet travels from the divergence point 225 to an exit 226 of the printer 110. By contrast, in the duplex print mode, the print engine 240 marks the front side of the sheet of media and the sheet travels from the divergence point 225 to a flipping device 260 and a turn point 227. The flipping device 260 is any device or combination of devices operable to flip a sheet of media such that its opposite side may be marked by print engine 240. As such, the flipping device 260 may convey the media in a loop back to the beginning point 224 and print engine 240 for printing on the back side of the sheet of media. After both sides of the sheet are printed, the media may be output at the exit 226 of the printer 110.

In general, simplex printing is faster than duplex printing because media is output from the printer 110 soon after the front side is printed rather than being flipped and looped back around inside the printer 110 for printing on the back side. For instance, in this example, the media path 250 includes a duplex path defined by the beginning point 224, the divergence point 225, the turn point 227, then back to the beginning point 224, the divergence point 225, and to the exit 226 of the printer 110, in that order. The simplex path, on the other hand, is a subset of the duplex path and is shorter in length. In this example, the simplex path is defined by the beginning point 224, the divergence point 225, and the exit 226. As such, the time for a sheet to traverse the simplex path is shorter as compared to the duplex path of the printer 110.

However, if the printer 110 is in the duplex print mode, there is a delay in printing associated with switching to the simplex print mode. The delay enables the print system 100 to confirm that the media path 250 is sufficiently cleared from the paper path so that simplex sheets do not interfere with a previously conveyed duplex sheet. The amount of delay to switch from duplex print mode to simplex print mode may depend on characteristics of the print system 100. For example, the print system 100 which includes post-print devices 131-136 may confirm the media path 250 as clear after the duplex sheet (e.g., the last duplex sheet before a series of simple sheets) is output at the last finishing device (e.g., the trimmer 136). As such, the delay for switching may depend in part on the particular configuration of post-print devices 131-136 connected with the printer 110 which effectively extend the media path 250. Alternatively, the print system 100 may determine the media path 250 to be sufficiently clear for switching at some other point along the media path 250 (e.g., as the duplex sheet passes through the print engine 240, as the duplex sheet is output through the exit 226 of the printer 110, etc.).

Figure 3:
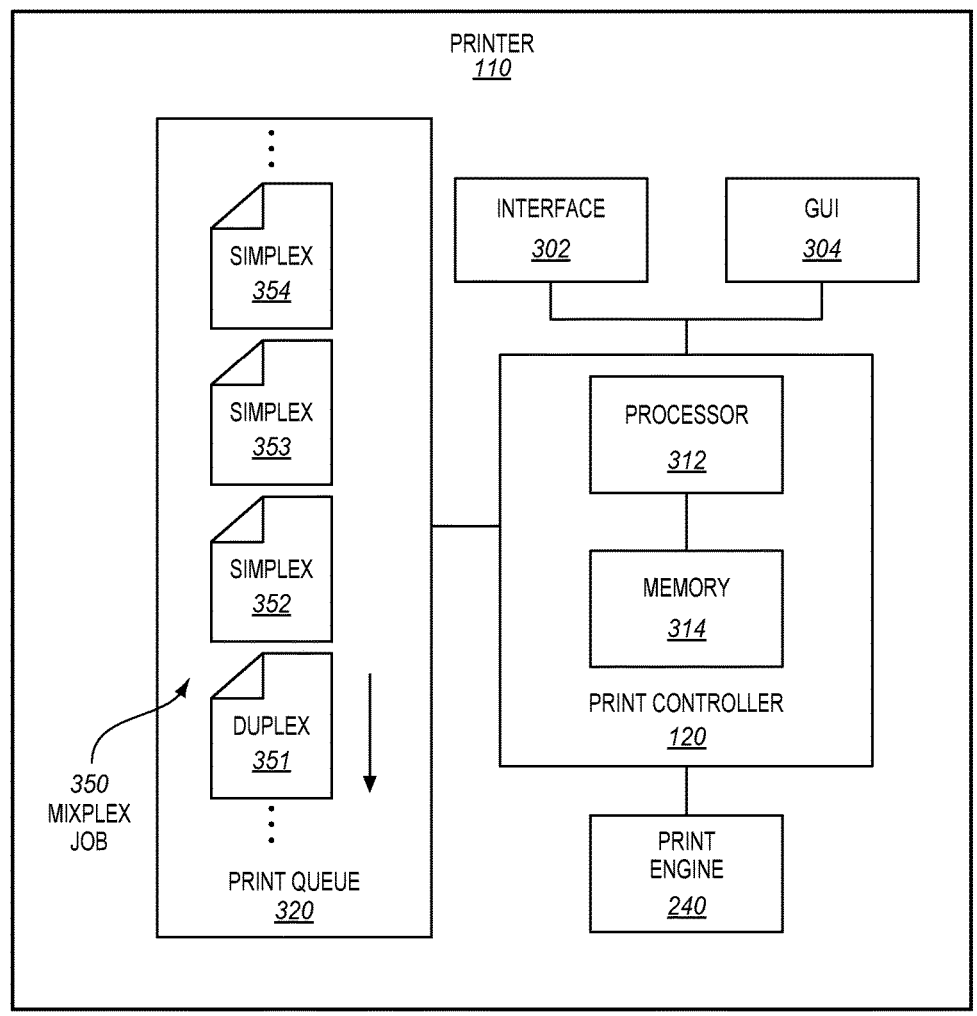
FIG. 3 is a block diagram of a printer in an illustrative embodiment.

FIG. 3 is a block diagram of the printer 110 in an illustrative embodiment. The printer 110 includes an interface (I/F) 302 (e.g., an Ethernet interface, wireless interface, etc.) that is a device or component (e.g., hardware) operable to receive/transmit print data for print jobs and also includes a graphical user interface (GUI) 304 to enable a print shop operator or another user to review, create, and/or modify print jobs. The print controller 120 may rasterize print jobs into bitmap data and store pages of the print jobs in a print queue 320 (e.g., Random Access Memory (RAM), a hard disk, or other type of memory device). The print engine 240 receives the rasterized pages from the print queue 320 and marks physical sheets of media accordingly. That is, as used herein, the term page refers to print data intended for a side of a physical sheet, and the term sheet refers to the piece of media/paper upon which the print image resides (on either or both sides of the sheet).

The pages are generally printed in an order from the front to the back of the print queue 320. FIG. 3 illustrates the print queue 320 storing a mixplex job 350 having a duplex page 351 at the front of the print queue 320 to print first, a simplex page 352 to print second, a simplex page 353 to print third, and a simplex page 354 to print fourth. Pages may be removed from the print queue 320 as they are sent to the print engine 240 for printing onto sheets. To print the duplex page 351, the printer 110 is put in duplex print mode and the duplex sheet corresponding to the duplex page 351 traverses the duplex media path of the printer 110 as described in FIG. 2.

However, the simplex pages 352-354 may be printed in either the simplex print mode or the duplex print mode. If the printer 110 switches from duplex print mode to simplex print mode for printing the simplex pages 352-354, printing throughput is improved in that the corresponding media sheets need only travel the shorter simplex media path, but negatively impacted by the above-described delay in switching the print modes. On the other hand, if the printer 110 remains in the duplex print mode for printing the simplex pages 352-354 (i.e., such that the simplex sheets traverse the duplex paper path to receive printing on one sheet side, are flipped and conveyed to loop back through the print engine 240 which "prints" a blank on the back sheet side), printing throughput is improved by avoiding the delay in switching print modes, but negatively impacted due to the increased time to traverse the longer duplex media path.

In prior print systems, a predetermined number of simplex sheets may be instructed to print in a duplex print mode (where the back side is "printed" as a blank page) to avoid the delay associated with switching the print mode from duplex to simplex. For example, if there are less than five simplex sheets in a row, the print system sends those five simplex sheets through the duplex media path to avoid the switching delay, otherwise, if there are more than five simplex sheets in a row, the print system switches to simplex for printing the five simplex sheets. However, the drawback of this existing implementation is that the predetermined number of simplex pages to send through the duplex media path is static and results in suboptimal printing performance.

The print controller 120 is enhanced to adaptively determine whether or not to switch the printer 110 from duplex print mode to simplex print mode. In doing so, the print controller 120 may analyze the upcoming, non-printed pages stored in the print queue 320 to determine which print mode is likely to achieve a faster throughput for the mixplex job 350. The print controller 120 may continuously track variables of the print system 100 and incoming pages to adapt its threshold for switching print modes over time, thereby ensuring highly efficient printing throughput for mixplex jobs.

While the specific hardware implementation of the print controller 120 is subject to design choices, one particular embodiment may include one or more processors 312 coupled with a memory 314. The processor 312 includes any electronic circuits and/or optical circuits that are able to perform functions. For example, a processor may include one or more Central Processing Units (CPU), microprocessors, Digital Signal Processors (DSPs), Application-Specific Integrated Circuits (ASICs), Programmable Logic Devices (PLD), control circuitry, etc. Some examples of processors include Intel Core processors, Advanced Reduced Instruction Set Computing (RISC) Machines (ARM) processors, etc. The memory 314 includes any hardware device that is able to store data. The memory 314 may include one or more volatile or non-volatile Dynamic Random Access Memory (DRAM) devices, FLASH devices, volatile or non-volatile Static RAM devices, hard drives, Solid State Disks (SSDs), etc. Some examples of non-volatile DRAM and SRAM include battery-backed DRAM and battery-backed SRAM. It will be appreciated that the particular arrangement, number, and configuration of components and elements described herein with respect to FIGS. 1-3 are examples provided for discussion purposes and that numerous alternatives to such is possible. Illustrative details of the operation of the print system 100 and the print controller 120 will be discussed with regard to FIG. 4 and FIG. 5.

Figure 4:
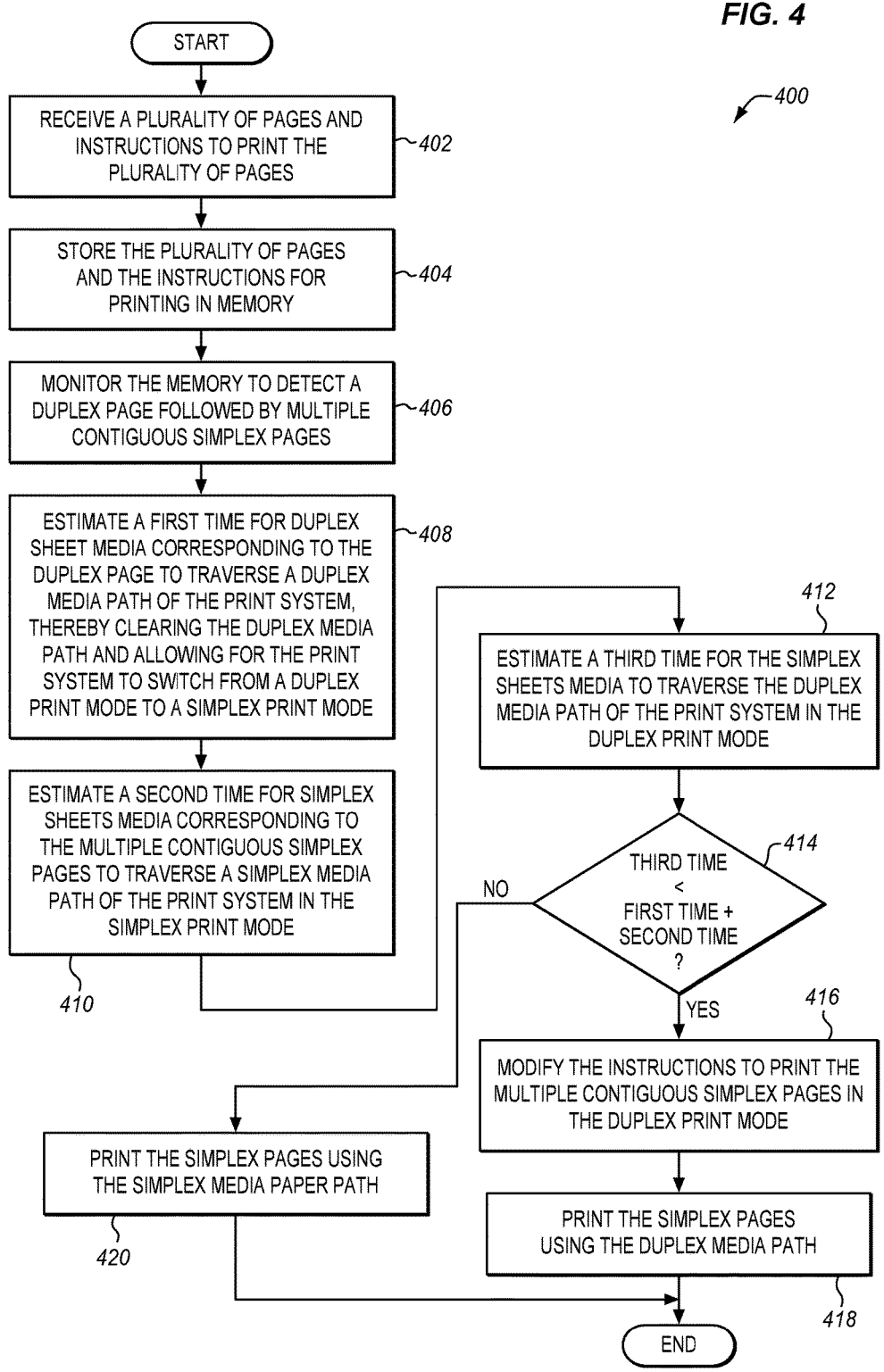
FIG. 4 is a flow chart illustrating a method for determining whether to switch a print mode from duplex to simplex in an illustrative embodiment.

FIG. 4 is a flow chart illustrating a method 400 for determining whether to switch a print mode from duplex to simplex in an illustrative embodiment. The steps of method 400 will be described with respect to the print system 100, the printer 110 and the print controller 120 of FIGS. 1-3, although one skilled in the art will understand that the method 400 may be performed by other systems not shown. The steps of the flow charts described herein are not all inclusive, may include other steps not shown, and may be performed in alternative orders.

In step 402, the interface 302 receives a plurality of pages and instructions to print the plurality of pages. A print job may be accompanied by a job ticket describing media properties (e.g., color, size, input tray, post-print finishing operations, etc.) and other instructions for printing. The pages may include rasterized print data or raw print data that is stored in memory 314 and rasterized with the processor 312 of the print controller 120.

In step 404, the print controller 120 stores the plurality of pages and the instructions in memory. As pages are received, rasterized, or otherwise become available in condition for the print engine 240, the print controller 120 may store the pages in the print queue 320. The print instructions may be stored in memory 314. The print queue 320 and memory 314 may reside on the same memory device or separate memory devices.

In step 406, the print controller 120 monitors the memory (e.g., the print queue 320) to detect a duplex page followed by multiple contiguous simplex pages. That is, the print controller 120 is configured to analyze incoming, non-printed pages to determine if the next pages to print are simplex or duplex, and to detect instances in which multiple simplex pages are intended to print in a row without interruption of a duplex page between the simplex pages. The number of pages that can be analyzed at any given time is variable based on the rate at which pages are rasterized and stored in print queue 320 and the rate at which print engine 240 produces corresponding sheets.

In step 408, the print controller 120 estimates or otherwise determines a first time for duplex sheet media corresponding to the duplex page to traverse a duplex media path of the print system 100, thereby clearing the duplex media path and allowing for the print system 100 to switch from a duplex print mode to a simplex print mode. As described above, the time to sufficiently clear the duplex media path for switching the print mode may vary depending on various characteristics of the print system 100. For example, the print controller 120 may determine when the duplex media path is clear in response to detecting (e.g., via sensor and/or notification from post-print devices 131-136) that the duplex sheet media is output at the last finishing device of the print system 100 (e.g., the trimmer 136). Alternatively, the print controller 120 may determine when the duplex media path is clear in response to detecting the duplex sheet media at various points along the media path of the print system 100 (e.g., as the duplex sheet media passes through the print engine 240, is output through the exit 226 of the printer 110, etc.).

Alternatively or additionally, the print controller 120 may determine or otherwise estimate the first time for sufficiently clearing the duplex media path to switch the print mode based on analyzed print instructions/properties of the duplex page, its corresponding duplex sheet media, and the configuration and settings of print system 100. In other words, the first time may be the time duration for the sheet of a duplex page to traverse from a starting point of the duplex paper path to an exit point. For example, the amount of time to clear may depend on how far the duplex sheet media is to physically travel from an input tray (e.g., one of the local input trays 121-122 or external input trays 122-123) to one of the post-print devices 131-136. Since input trays and post-print devices 131-136 may connect with the printer 110 optionally and in a variety of configurations, the print controller 120 may detect connected devices, detect content of the devices (e.g. the type, size and/or orientation of print media loaded in a tray), associate (e.g., in memory 314) each device with a time for conveying/finishing media, determine which of the devices are to be used for the duplex sheet media based on instructions/properties for the duplex page in the print queue 320, and calculate the first time for switching print modes by taking into account the conveying/finishing time for each device to be used for the duplex sheet media. The print controller 120 may also take into account the size of the duplex sheet media which may slightly affect the time to clear the media path.

In step 410, the print controller 120 estimates or otherwise determines a second time for simplex sheets corresponding to the multiple contiguous simplex pages to traverse a simplex media path of the print system 100 in a simplex print mode. In doing so, the print controller 120 may determine a number of the multiple contiguous simplex pages in the print queue 320. The print controller 120 may calculate the second time based on the number of simplex pages in a row and a length of the simplex media path of the print system 100. Determining the second time may be based on analyzed print instructions/properties of the pages, the corresponding sheet media, and the configuration and settings of print system 100, similar to that described above. Alternatively, the print controller 120 may calculate the second time based on a time (e.g., stored in memory 314) for conveying media along the simplex media path.

In step 412, the print controller 120 estimates or otherwise determines a third time for the simplex sheets to traverse the duplex media path of the print system 100 in the duplex print mode. As such, the print controller 120 may calculate the third time based on the number of simplex pages in a row and a length of the duplex media path of the print system 100 (or a time associated with conveying media along the duplex media path). The length/time for conveying media along the simplex/duplex media paths may vary according to characteristics (e.g. configuration and settings) of the print system 100 and/or the instructions/properties of the simplex pages in the print queue 320 (e.g., which input trays to convey from and associated time for doing so), similar to that already described above.

In step 414, the print controller 120 determines whether the third time exceeds a sum of the first time and the second time. That is, the print controller 120 determines whether it is faster for the print system 100 to remain in the duplex print mode for printing the simplex pages (e.g., taking the third time) or to switch the duplex print mode from duplex to simplex (e.g., taking the first time) for printing the simplex pages in the simplex print mode (e.g., taking the second time).

If the third time is less than the sum of the first time and second time, the method 400 proceeds to step 416 and the print controller 120 modifies the instructions to print the multiple contiguous simplex pages in the duplex print mode. Then, in step 418, the print controller 120 instructs the printer 110 to print the simplex pages using the duplex paper path. That is, the print controller 120 may output the simplex pages and the modified instructions to the print engine 240 for printing corresponding simplex media sheets in the duplex mode (i.e. the duplex paper path). Otherwise, if the third time exceeds the sum of the first time and the second time, the method 400 proceeds to step 420 and the processor 312 instructs the printer 110 to print the simplex pages using the simplex print mode. In one embodiment, modifying the instructions to print the multiple contiguous simplex pages in the duplex print mode includes changing a tag on the instructions corresponding to each contiguous simplex page from a value designating simplex to a value designating duplex. In another embodiment, modifying the instructions to print the multiple contiguous simplex pages in the duplex print mode further includes adding a blank page corresponding to each of the simplex pages.

Using method 400, the print controller 120 tracks variables of the print system 100 (e.g., which input trays and output devices are in use, which media is loaded in which device, etc.) and variations in properties of incoming sheets (e.g., travel distance from its input tray to its destination output device) to adapt the threshold for switching between using the duplex media path and the simplex media path. In doing so, the print controller 120 is able to accurately determine whether or not switching the print mode from duplex print mode to simplex print mode is to result in faster printing throughput. However, the number of pages that can be analyzed at any given time is variable based on the rate at which pages are rasterized and stored in print queue 320 and the rate at which print engine 240 produces corresponding sheets. Accordingly, the print controller 120 may be further enhanced to determine whether to switch in cases for which the exact number of simplex sheets in a row is unknown. The threshold may be defined as the number of contiguous simplex pages that resulted in a decision (e.g., Step 414) to modify instructions to print multiple contiguous simplex pages in the duplex print mode (e.g., Step 416). This threshold may be stored in memory 314 at Step 416 for each determination. Further, a running average (e.g., simple moving average, cumulative moving average, weighted moving average, etc.) for the threshold may be calculated for more than one threshold determination and stored in memory 314.

Figure 5:
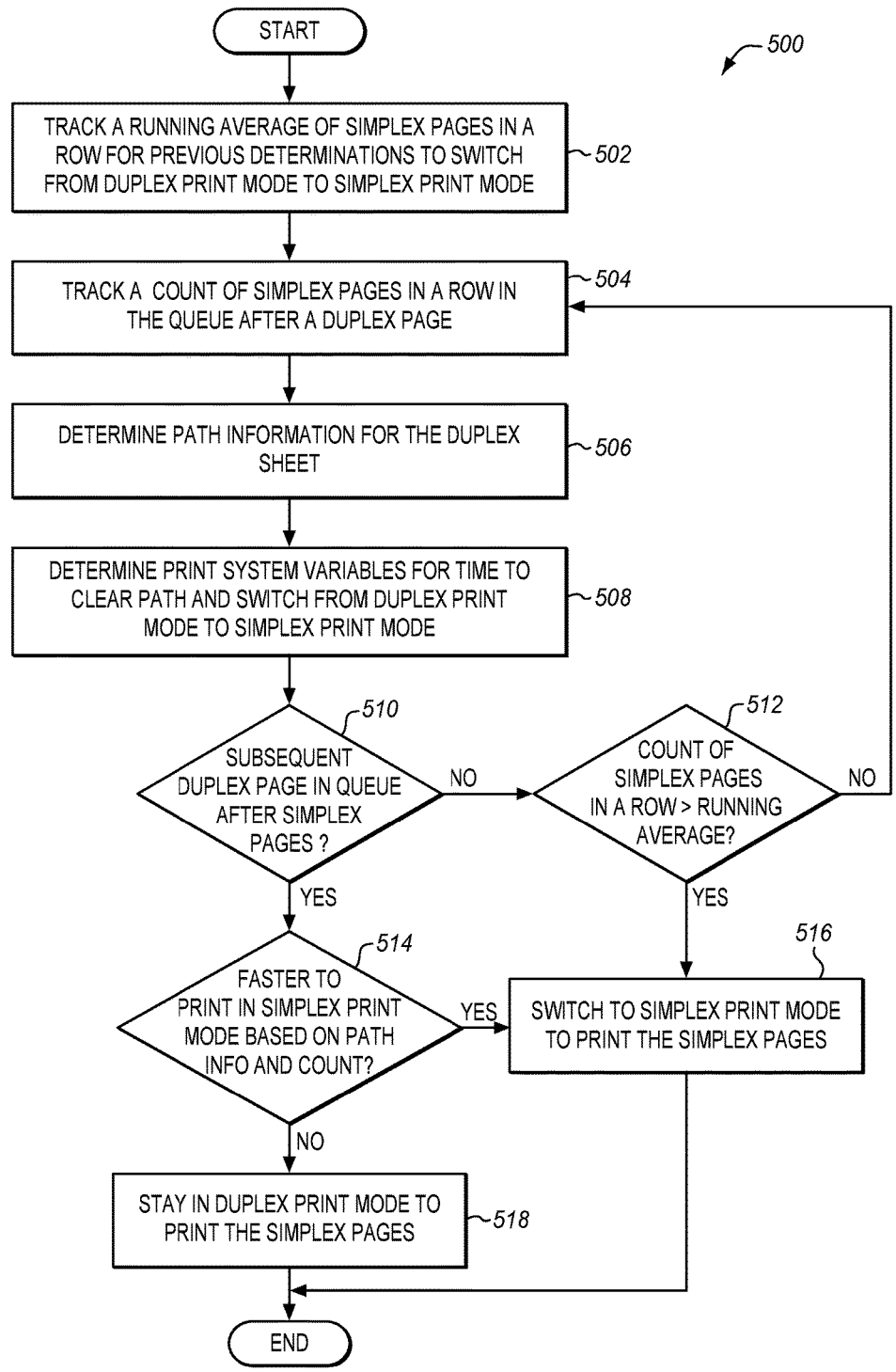
FIG. 5 is a flow chart illustrating a method for determining whether to switch a print mode from duplex to simplex in another illustrative embodiment.

FIG. 5 is a method 500 for determining whether to switch a print mode from duplex to simplex in another illustrative embodiment. The steps of method 500 will be described with respect to the print system 100, the printer 110 and the print controller 120 of FIGS. 1-3, although one skilled in the art will understand that the method 500 may be performed by other systems not shown. The steps of the flow charts described herein are not all inclusive, may include other steps not shown, and may be performed in alternative orders.

In step 502, the print controller 120 tracks a running average of the threshold for the number of contiguous simplex pages in a row that determine printing the simplex pages in duplex mode according to the previous determinations as explained above. For example, the print controller 120 may maintain (e.g., in memory 314) the average number of contiguous simplex pages for the last eight sequences of determining to switch from duplex print mode to simplex print mode.

In step 504, the print controller 120 tracks a count of known simplex pages in a row (i.e. contiguous) in the print queue 320 after a duplex page. As described above, the number of pages that can be analyzed at any given time is variable based on the rate at which pages are rasterized and stored in print queue 320 and the rate at which print engine 240 produces corresponding sheets. Accordingly, the print controller 120 may determine whether to switch in cases for which the exact number of simplex sheets in a row is unknown as described below.

In step 506, the print controller 120 determines path information for the duplex sheet. And, in step 508, the print controller 120 determines print system variables for time to clear path and switch from duplex print mode to simplex print mode. In steps 506-508, the print controller 120 may determine: (1) time for the duplex sheet to get from an input tray to a print head, (2) time for the duplex sheet to print, (3) time for the duplex sheet to reach an output device, (4) time for the output device to complete a finishing operation, and/or (5) time to complete any cleaning cycle which may occur when media path is cleared. The print system 100 may perform cleaning operations periodically, in response to user instruction, after a threshold amount of printing is performed, in response to switching simplex/duplex mode, etc. In any case, the print system 100 may schedule a cleaning operation for the next time the media path of the print system 100 is cleared.

In step 510, the print controller 120 determines whether a subsequent duplex page exists in the print queue 320 after the simplex pages. If so, then the print controller 120 may ascertain the number of contiguous simplex pages that are between a leading duplex page and a trailing duplex page. In that case, the method 500 may proceed to step 514 where the print controller 120 determines whether it is faster to print in simplex print mode based on the path information of the leading duplex page and the count of simplex pages in a row (e.g., determined in steps 504-508). If, in step 514, it is determined that printing in simplex print mode is not faster, the method 500 proceeds to step 518 and the print controller 120 instructs the print system 100 to stay in the duplex print mode to print the simplex pages. Otherwise, the print controller 120 instructs the print system 100 to switch to simplex print mode to print the simplex pages in step 516. The print controller 120 may determine whether it is faster to print in simplex print mode based on the following equation:

if((time to clear media path)+(time to print one simplex page)*(number of simplex pages to print)<
(time to print one duplex page)*(number of simplex pages to print))  Equation (1)

On the other hand, if it is determined in step 510 that there is not a subsequent duplex page in the print queue 320 after the simplex pages (e.g., the exact number of simplex pages in a row is unknown), the method 500 proceeds to step 512 where the print controller 120 determines whether the count of simplex pages in a row is greater than the running average. If so, the print controller 120 instructs the print system 100 to switch to simplex print mode to print the simplex pages in step 516. Otherwise, the method 500 may return to step 504 for the print controller 120 to continuously monitor variables that adapt its determination of whether to switch print modes.

Figure 6:
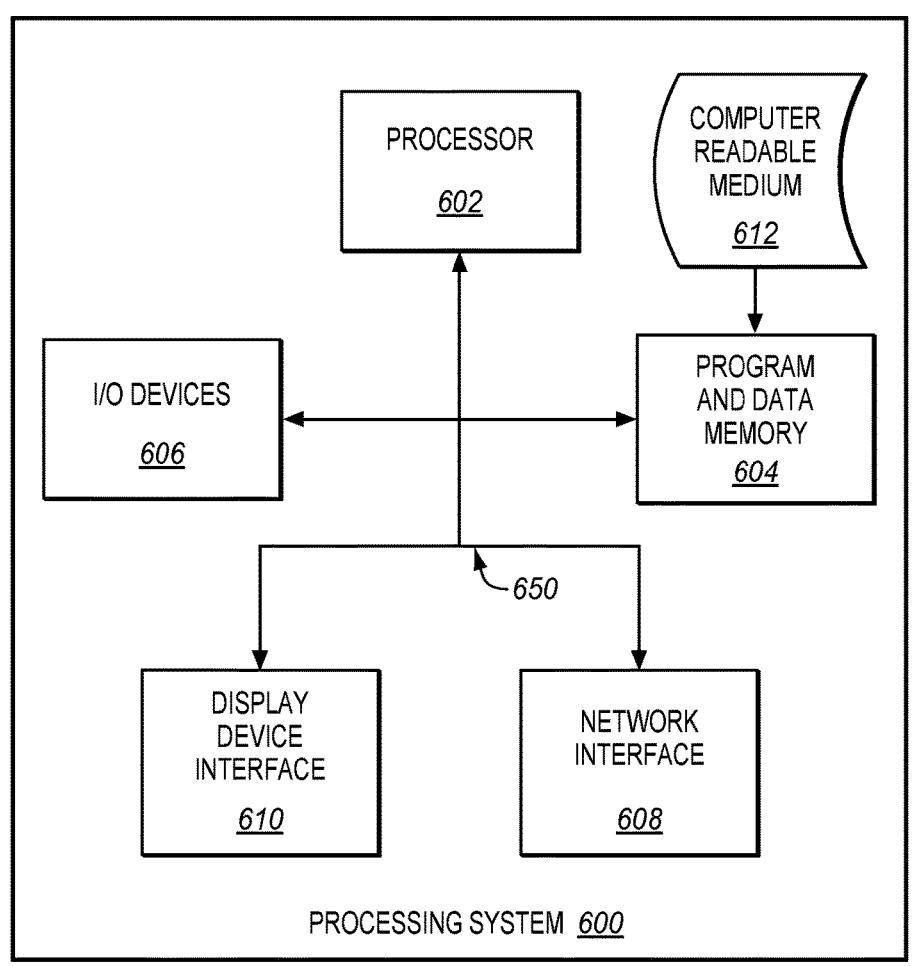
FIG. 6 illustrates a computer system operable to execute computer readable medium embodying programmed instructions to perform desired functions in an illustrative embodiment.

Embodiments disclosed herein can take the form of software, hardware, firmware, or various combinations thereof. In one particular embodiment, software is used to direct a processing system to perform the various operations disclosed herein. FIG. 6 illustrates a processing system 600 operable to execute a computer readable medium embodying programmed instructions to perform desired functions in an illustrative embodiment. Processing system 600 is operable to perform the above operations by executing programmed instructions tangibly embodied on computer readable storage medium 612. In this regard, embodiments of the invention can take the form of a computer program accessible via computer-readable medium 612 providing program code for use by a computer or any other instruction execution system. For the purposes of this description, computer readable storage medium 612 can be anything that can contain or store the program for use by the computer.

Computer readable storage medium 612 can be an electronic, magnetic, optical, electromagnetic, infrared, or semiconductor device. Examples of computer readable storage medium 612 include a solid state memory, a magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and DVD.

Processing system 600, being suitable for storing and/or executing the program code, includes at least one processor 602 coupled to program and data memory 604 through a system bus 650. Program and data memory 604 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 606 (including but not limited to keyboards, displays, pointing devices, etc.) can be coupled either directly or through intervening I/O controllers. Network adapter interfaces 608 may also be integrated with the system to enable processing system 600 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 610 may be integrated with the system to interface to one or more display devices, such as printing systems and screens for presentation of data generated by processor 602.

Although specific embodiments were described herein, the scope of the invention is not limited to those specific embodiments. The scope of the invention is defined by the following claims and any equivalents thereof.

What is claimed is:

1. A print system comprising:
an interface configured to receive a plurality of pages and instructions to print the plurality of pages;
memory configured to store the plurality of pages and the instructions for printing; and
a print controller configured to monitor the memory to detect a duplex page followed by multiple contiguous simplex pages, to estimate a first time for a duplex sheet corresponding to the duplex page to traverse a duplex media path of the print system, thereby clearing the duplex media path and allowing for the print system to switch from a duplex print mode to a simplex print mode, to estimate a second time for simplex sheets corresponding to the multiple contiguous simplex pages to traverse a simplex media path of the print system in the simplex print mode, to estimate a third time for the simplex sheets to traverse the duplex media path of the print system in the duplex print mode, to modify the instructions to print the multiple contiguous simplex pages in the duplex print mode if the third time is less than a sum of the first time and the second time, and to output the plurality of pages and the instructions for printing.

2. The print system of claim 1 wherein:
the print controller is configured to analyze the instructions to identify an input tray for the duplex sheet, and to estimate the first time based on a time for the duplex sheet to traverse the duplex media path from a starting point to an exit point of the print system.

3. The print system of claim 2 wherein:
the print controller is configured to analyze the instructions to identify a post-print device of the print system that is a destination for the duplex sheet, and to estimate the first time based further on a time for the duplex sheet to travel from an exit of a print engine to the post-print device and a time for the post-print device to complete a finishing operation on the duplex sheet.

4. The print system of claim 3 wherein:
the print controller is configured to determine that a cleaning operation is to be performed after clearing the duplex media path, and to estimate the first time based further on a time to perform the cleaning operation.

5. The print system of claim 1 wherein:
the print controller is configured to estimate the second time based on a time for a single simplex sheets to traverse the simplex media path of the print system in the simplex print mode and a number of the simplex sheets.

6. The print system of claim 1 wherein:
the print controller is configured to track a running average of a threshold of multiple contiguous simplex pages for previous determinations, to count a number of the multiple contiguous simplex pages in the memory, and to modify the instructions to print the multiple contiguous simplex pages in the simplex print mode if the number exceeds the running average.

7. The print system of claim 1 wherein:
the print controller is configured to estimate the third time based on a time for a single simplex sheets to traverse the duplex media path of the print system in the duplex print mode, and a number of the simplex sheets corresponding to the multiple contiguous simplex pages in the memory.

8. The print system of claim 1 wherein:
the print controller is configured to modify the instructions to print the multiple contiguous simplex pages in the simplex print mode if the third time is more than a sum of the first time and the second time.

9. The print system of claim 1 further comprising:
a cut-sheet printer;
wherein the cut-sheet printer is configured to switch between the duplex print mode and the simplex print mode.

10. A method comprising:
receiving a plurality of pages and instructions to print the plurality of pages;
storing the plurality of pages and the instructions for printing in memory;
monitoring the memory to detect a duplex page followed by multiple contiguous simplex pages;
estimating a first time for a duplex sheet corresponding to the duplex page to traverse a duplex media path of a print system, thereby clearing the duplex media path and allowing for the print system to switch from a duplex print mode to a simplex print mode;
estimating a second time for simplex sheets corresponding to the multiple contiguous simplex pages to traverse a simplex media path of the print system in the simplex print mode;
estimating a third time for the simplex sheets to traverse the duplex media path of the print system in the duplex print mode;
modifying the instructions to print the multiple contiguous simplex pages in the duplex print mode if the third time is less than a sum of the first time and the second time; and
outputting the plurality of pages and the instructions for printing.

11. The method of claim 10 further comprising:
analyzing the instructions to identify an input tray for the duplex sheet; and
estimating the first time based on a time for the duplex sheet to traverse the duplex media path from a starting point to an exit point of the print system.

12. The method of claim 10 further comprising:
estimating the second time based on a time for a single simplex sheets to traverse the simplex media path of the print system in the simplex print mode and a number of the simplex sheets.

13. The method of claim 10 further comprising:
tracking a running average of a threshold of multiple contiguous simplex pages for previous determinations;
counting a number of the multiple contiguous simplex pages in the memory; and
modifying the instructions to print the multiple contiguous simplex pages in the simplex print mode if the number exceeds the running average.

14. The method of claim 10 further comprising:
modifying the instructions to print the multiple contiguous simplex pages in the simplex print mode if the third time is more than a sum of the first time and the second time.

15. A tangible computer readable medium including programmed instructions which, when executed by a processor, are operable for performing a method, the method comprising:
receiving a plurality of pages and instructions to print the plurality of pages;
storing the plurality of pages and the instructions for printing in memory;
monitoring the memory to detect a duplex page followed by multiple contiguous simplex pages;
estimating a first time for a duplex sheet corresponding to the duplex page to traverse a duplex media path of a print system, thereby clearing the duplex media path and allowing for the print system to switch from a duplex print mode to a simplex print mode;
estimating a second time for simplex sheets corresponding to the multiple contiguous simplex pages to traverse a simplex media path of the print system in the simplex print mode;
estimating a third time for the simplex sheets to traverse the duplex media path of the print system in the duplex print mode;
modifying the instructions to print the multiple contiguous simplex pages in the duplex print mode if the third time is less than a sum of the first time and the second time; and
outputting the plurality of pages and the instructions for printing.

16. The medium of claim 15 wherein the method further comprises:
analyzing the instructions to identify an input tray for the duplex sheet; and
estimating the first time based on a time for the duplex sheet to traverse the duplex media path from a starting point to an exit point of the print system.

17. The medium of claim 15 wherein the method further comprises:
estimating the second time based on a time for a single simplex sheets to traverse the simplex media path of the print system in the simplex print mode and a number of the simplex sheets.

18. The medium claim 15 wherein the method further comprises:
tracking a running average of a threshold of multiple contiguous simplex pages for previous determinations;
counting a number of the multiple contiguous simplex pages in the memory; and
modifying the instructions to print the multiple contiguous simplex pages in the simplex print mode if the number exceeds the running average.

19. The medium claim 15 wherein the method further comprises:
estimating the third time based on a time for a single simplex sheets to traverse the duplex media path of the print system in the duplex print mode, and a number of the simplex sheets corresponding to the multiple contiguous simplex pages in the memory.

20. The medium claim 15 wherein the method further comprises:
modifying the instructions to print the multiple contiguous simplex pages in the simplex print mode if the third time is more than a sum of the first time and the second time.

* * * * *